United States Patent Office 3,542,757
Patented Nov. 24, 1970

---

3,542,757
AZOBIS[2-PHENYLACRYLIC ACID,
3-TROPANYL ESTERS]
Henry C. Caldwell, Ambler, and William G. Groves, Norristown, Pa., assignors to Smith Kline & French Laboratories, Philadelphia, Pa., a corporation of Pennsylvania
No Drawing. Filed Jan. 31, 1968, Ser. No. 701,868
Int. Cl. A61k 27/00; C07c 107/00; C09b 27/00
U.S. Cl. 260—152                                    10 Claims

ABSTRACT OF THE DISCLOSURE

Substituted azodiphenylbis[2-phenylacrylic acid, 3-tropanyl esters] having gastrointestinal spasmolytic activity. The substituent on the 3 carbon atom of the 2-phenylacrylic acid derivatives being hydrogen, phenyl, furyl, thienyl and pyridyl and the diphenyl substituents optionally being halogen, lower alkyl lower alkoxy and hydroxy. Method of preparation comprises reacting the properly substituted nitrophenylacetic acid with paraformaldehyde or anaromatic aldehyde, converting the resulting acid to the azo derivative by reducing with zinc dust and sodium hydroxide and treating the azo derivative with tropine or thiotropine to obtain the desired tropanyl ester.

---

This invention relates to novel substituted azobis-[2-phenylacrylic acid, 3-tropanyl esters] which have useful pharmacodynamic activity. More specifically, the compounds of this invention possess gastrointestinal spasmolytic activity as demonstrated in standard animal pharmacological test procedures. For example, in the modified Janssen test for the inhibition of fecal pellet count, spasmolytic activity was observed at a dose of 50.0 mg./kg. to 100.0 mg./kg. administered orally to mice. Specifically, 2,2'-m-azodiphenylbis (3-phenylacrylic acid, 3-tropanyl ester) dihydrochloride demonstrated spasmolytic activity at 62.5 mg./kg. in mice.

These novel compounds are particularly advantageous because they produce the spasmolytic activity without the concomitant mydriatic and antisalivary side effects which are common to known anticholinergic-antispasmodic drugs. Prior to the present invention, there has been a great need for compounds which produce spasmolytic activity without the usual anticholingergic side effects, such as, for example, dry mouth, blurred vision and urinary retention which are common to known anticholinergic-antispasmodic drugs. The need of safe and effective compounds free of the above-noted side effects and having spasmolytic activity has been great.

The novel substituted azo tropanyl esters of this invention are represented by the following general formula:

Formula 1

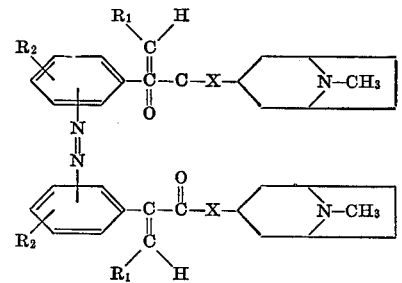

when:

X represents oxygen or sulfur;
$R_1$ represents hydrogen, phenyl, furyl, thienyl and pyridyl; and
$R_2$ represents hydrogen, a straight or branched chain lower alkyl of 1 to 6 carbon atoms preferably methyl or ethyl, lower alkoxy of 1 to 6 carbon atoms preferably methoxy or ethoxy, halogen such as bromo, chloro, or fluoro; and hydroxy.

Advantageous compounds of this invention are represented by the above structural formula when $R_1$ represents phenyl and $R_2$ represents halogen such as chloro, bromo, or fluoro, methoxy or ethoxy.

The preferred and most advantageous compound of this invention is represented by the following structural formula:

Formula 2

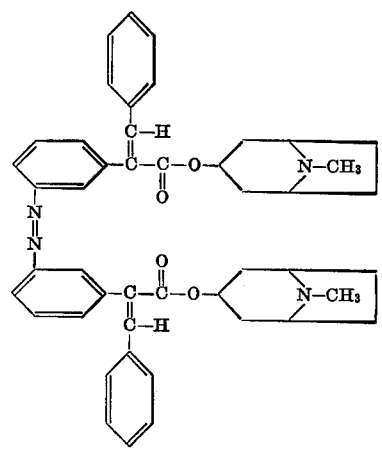

The substituted azobis[2-phenylacrylic acid-3-tropanyl esters] are prepared according to the following synthetic procedure:

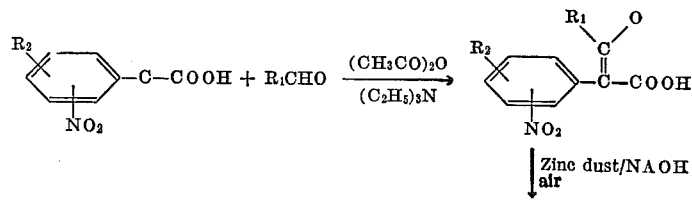

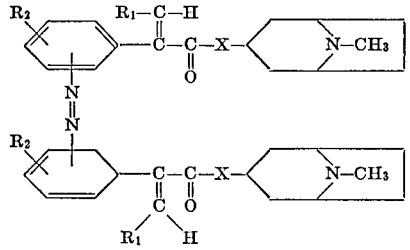

The method is carried out using readily available starting materials and gives excellent yields of the end product. Where certain compounds desired for use as starting materials are not available they can be prepared by methods described in the literature and well known to the art for preparing analogous compounds as described in the examples. For example, the thiotropine is prepared by reducing tropinone with hydrogen sulfide or sulfur as detailed in Ind. Eng. Chem., 42, 2547 (50) for the reduction of cyclohexanone to cyclohexanethiol.

The properly substituted nitrophenylacetic acid is converted to the tropic acid derivative by placing the acid in an organic solvent, preferably benzene and slowly adding it to a reflux mixture of ether, magnesium turnings and isopropyl chloride. The mixture is then refluxed for approximately two hours after the addition of the acid is completed and then cooled. Paraformaldehyde is then distilled into the mixture with stirring. The mixture is then poured into ice and concentrated sulfuric acid and again stirred. The crude solid which forms is then filtered and recrystallized from water and dried. The solid is further purified by treatment with hot water and benzene. The product is filtered from cool aqueous solution to yield the properly substituted nitrotropic acid. The tropic acid derivative is then converted to the corresponding azobis tropic acid by reducing with zinc dust and sodium hydroxide and passing air through this solution.

The azobis tropic acid derivative is then converted to the desired azobis[2-phenylacrylic acid, 3-tropanyl ester] by preparing a solution of the azobis tropic acid in acetyl chloride and refluxing. Thionyl chloride is then added with continued refluxing. The excess thionyl chloride is removed and either tropine or thiotropine hydrobromide in pyridine is added and the mixture heated. The mixture is cooled with the addition of water and the resultant solid filtered and recrystallized from water to yield the desired azobis-3-tropanyl 2-phenyl acrylate derivative.

The corresponding 3-substituted 2-phenylacrylic acid derivatives are prepared by reacting the properly substituted nitrophenylacetic acid with an aromatic aldehyde in an organic solvent such as acetic anhydride and using a teritiary amine such as triethylamine, pyridine or N,N'-dimethyl-aniline as a catalyst. The mixture is then heated.

The resulting 3-substituted 2-phenylacrylic acid derivative is then converted to the coresponding azobis derivative by reducing with zinc dust and sodium hydroxide, then reacting with tropine, thiotropine or a salt thereof.

The azobis-3-tropanyl-2-phenyl acrylate derivative is then prepared by reacting this acid with a salt of tropine or thiotropine in the presence of thionyl chloride.

This invention also includes nontoxic pharmaceutically acceptable addition salts of the above-defined bases formed with organic and inorganic acids. Such salts are easily prepared by methods known to the art. The base is reacted with either the stoichiometric amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzenesulfonic and theophylline acetic acids as well as the 8-halotheophyllines, for example, 8-chlorotheophylline and 8-bromotheophylline. Exemplary of such inorganic salts are those with hydrochloric, hydrobromic, sulfuric, sulfamic, phosphoric and nitric acids. These salts may also be prepared by the classical method of double decomposition of appropriate salts which is well known to the art.

Further, exemplary of salts are nontoxic quaternary ammonium salts of the above-defined bases formed with pharmacologically acceptable lower alkyl or aralkyl esters of, for example, sulfuric, hydrohalic and aromatic sulfonic acids. These salts are prepared by treating a solution of the base in a suitable solvent, such as chloroform, acetone, benzene, toluene or ether with an excess of an organic ester of sulfuric, hydrohalic or aromatic sulfonic acid. This reaction is carried out most advantageously at a temperature in the range of from about 25° C. to about 115° C. Exemplary of such reactive esters are lower alkyl halides of a maximum of 8 carbon atoms such as methyl chloride, methyl bromide, methyl iodide, ethyl chloride, propyl bromide, butyl chloride, isobutyl chloride, ethylene bromohydrine, ethylene chlorohydrine, allyl bromide, methallyl bromide, crotyl bromide, benzyl chloride, benzyl bromide, naphthylmethyl chloride, penethyl bromide, dimethyl sulfate, diethyl sulfate, methyl benzene sulfate and ethyl toluene sulfonate.

The novel compounds of this invention may be administered orally or parenterally in conventional dosage unit forms such as tablets, capsules, injectables or the like, by incorporating the appropriate dose of a compound of Formula 1 with carriers according to accepted pharmaceutical practices. The substituted azo 3-tropanyl esters of Formula 1 will be present in an amount to produce gastrointestinal spasmolytic activity. Preferably the dosage unit forms will contain the compounds of Formula 1 in an amount of from about 2.0 mg. to about 100 mg., advantageously from about 5 mg. to about 50 mg. Advantageously equal daily dosages are administered one to four times daily to provide a daily dosage regimen.

The following examples are not limiting but are illustrative of this invention and the procedures for their preparation. Other variations of this invention will be obvious to those skilled in this art.

EXAMPLE 1

To a mixture containing 31.8 g. of m-nitrophenylacetic acid, 15 ml. of benzaldehyde and 16.2 ml. of triethylamine is added with cooling 44 ml. of acetic anhydride. The mixture is stirred for approximately ½ hour and heated in an oil bath at 70° C. The temperature is raised to 100° C. over a ½ hour period and heating continued for approximately five hours. The solution is cooled and made acidic with concentrated hydrochloric acid. The crude acid is filtered, dried and recrystallized from alcohol to yield 2-m-nitrophenyl-3-phenylacrylic acid.

A suspension of 20.2 g. of 2-m-nitrophenyl-3-phenylacrylic acid, 200 ml. of methanol, 10 g. of zinc dust and a solution of 28.8 g. of sodium hydroxide in 60 ml. of water is heated at reflux for one hour. At the end of one hour 9.6 g. of additional zinc dust is added and the mixture refluxed for two additional hours. The mixture is filtered and air is passed through the warm filtrate of the hydrazo acid salt to form the azo salt. The precipitated azo acid salt is dissolved in aqueous-methanol, acidified and crystallized from dioxane-water to yield 2,2'-m-azodiphenylbis[3-phenylacrylic acid], M.P. 299.5–300.5 with decomposition.

A suspension of 4.2 g. of 2,2' - m - azodiphenylbis-[3-phenylacrylic acid], 5.35 ml. of thionyl chloride and 42 ml. of dry benzene is warmed gently. The clear solution is refluxed and the excess thionyl chloride and benzene removed. The solution is washed with dry benzene and added to a solution containing 5.03 g. of tropine in 80 ml. of benzene. The mixture is heated at reflux and then filtered. The filtrate is washed with water, dried and dry hydrogen chloride is passed through the solution to yield the dihydrochloride salt of 2,2'-m-azodiphenylbis[3-phenylacrylic acid, 3-tropanyl ester] as a hydrate having a melting point of 288.5–290.0 with decomposition.

EXAMPLE 2

Similarly following the procedure of Example 1, 20.2 g. of 2-p-nitrophenyl-3-phenylacrylic acid was used as a starting material to yield 2,2'-p-azodiphenylbis[3-phenylacrylic acid, 3-tropanyl ester]dihydrochloride hydrate having a melting point of 290° C. with decomposition.

EXAMPLE 3

Similarly following the procedure of Example 1, 28.3 g. of 4-bromo-3-nitrophenylacetic acid, 16.0 g. of 5-nitro-2-hydroxyphenylacetic acid, 18.0 g. of 2-nitro-4-methoxyphenylacetic acid and 20.3 g. of 3-nitro-4-methylphenylacetic acid were employed to yield respectively 2,2'-m-azodi(p-bromophenyl)-bis[3-phenylacrylic acid, 3-tropanyl ester],2,2'-m-azodi(o-hydroxyphenyl)bis[3-phenylacrylic acid, 3-tropanyl ester], 2,2'-o-azodi(p-methoxyphenyl)bis[3-phenylacrylic acid), 3-tropanyl ester] and 2,2'-m-azodi(p-methylphenyl)bis[3-phenylacrylic acid, 3-tropanyl ester].

EXAMPLE 4

To a mixture under nitrogen containing 500 ml. of anhydrous ether, 27.6 g. of magnesium turnings and 11 drops of ethyl bromide is added 15 ml. of isopropyl chloride. The mixture is warmed until the reaction proceeds and 87 ml. more of isopropyl chloride is added and the mixture refluxed moderately for approximately one hour. A solution of 85.2 g. of p-nitrophenylacetic acid in 500 ml. of dry benzene is then added and the mixture further refluxed for approximately two hours. 50.0 g. of paraformaldehyde is then distilled into the mixture with the aid of a stream of dry nitrogen. The thick solution is stirred for about an hour after the formaldehyde distillation is completed and the mixture then poured into ice and 200 ml. of concentrated sulfuric acid, stirred and cooled to about 5° C. The crude solid is then filtered, recrystallized from water and dried at 40° C. in vacuo. The solid is then purified by treating with benzene, dissolving in hot water and extracting once again with benzene until aqueous layer is colorless. The aqueous solution is cooled and precipitate filtered to yield p-nitrotropic acid.

15.1 g. of p-nitrotropic acid and 50 ml. of acetyl chloride is warmed gently until a solution results. The clear solution is refluxed for about an hour and the excess acetyl chloride distilled off under reduced pressure. To this residue is added 150 ml. of methanol, 8 g. of zinc dust and a solution of 20.7 g. of sodium hydroxide in 50 ml. of water. This mixture is then heated at reflux. 7.5 g. of additional zinc dust is added and the mixture refluxed for two additional hours. The mixture is filtered and air is passed through the warm filtrate to form the azo salt. The precipitated azo acid salt is dissolved in aqueous-methanol, acidified and crystallized from dioxane-water to yield 2,2'-p-azodiphenylbis[acrylic acid].

A suspension of 6.0 g. of 2,2'-p-azodiphenylbis-[acrylic acid], 7.25 ml. of thionyl chloride and 50 ml. of benzene is warmed gently. The clear solution is refluxed and the excess thionyl chloride and benzene removed. The solution is washed with dry benzene and added to a solution containing 7.5 g. of tropine in 100 ml. of benzene. The mixture is heated at reflux and then filtered. The filtrate is washed with water and dried to yield 2,2'-p-azodiphenylbis[acrylic acid, 3-tropanyl ester].

EXAMPLE 5

Similarly following the procedure of Example 3, 42.1 g. of 4-bromo-3-nitrophenylacetic acid, 63.0 g. of 5-nitro-2-hydroxyphenylacetic acid, 28.3 g. of 2-nitro-4-methoxyphenylacetic acid and 31.4 g. of 3-nitro-4-methylphenylacetic acid were employed to yield respectively 2,2'-m-azodi(p-bromophenyl)bis[acrylic acid, 3-tropanyl ester], 2,2'-m-azodi(o-hydroxyphenyl)bis[acrylic acid, 3-tropanyl ester], 2,2' - o - azodi(p - methoxyphenylbis[acrylic acid, 3-tropanyl ester], and 2,2'-m-azodi(p-methylphenyl)bis[acrylic acid, 3-tropanyl ester].

EXAMPLE 6

To a mixture containing 60.0 g. of p-nitrophenylacetic acid, 32.1 ml. of thiophenealdehyde and 48.2 ml. of triethylamine is added 120 ml. of acetic anyhdride. The mixture is heated at 150° C. for about ½ hour and cooled to room temperature. The liquid is acidified with concentrated hydrochloric acid and the precipitated crude acid is extracted with 300 ml. of methylene chloride. The methylene chloride solution is washed with about 500 ml. of water and then extracted several times with 2% sodium hydroxide and the basic solution cooled in ice. The solution is acidified with glacial acidic acid, cooled to 5° C., and the acid filtered and dried. The acid is recrystallized from alcohol to yield 2-p-nitrophenyl-3-(2-thienyl)acrylic acid.

A suspension of 25.5 g. of 2-p-nitrophenyl-3-(2-thienyl) acrylic acid, 225 ml. of methanol, 15 g. of zinc dust and a solution of 12 g. of sodium hydroxide in 75 ml. of water is heated at reflux for one hour. 10.0 g. additional zinc dust is added and the mixture refluxed for an additional two hours. The mixture is filtered and air is passed through the warm filtrate to form the azo acid salt. This salt is dissolved in aqueous-methanol, acidified and crystallized from dioxane-water to yield 2,2'-p-azodiphenylbis[3-(2-thienyl)acrylic acid].

A suspension of 10.0 g. of 2,2'-p-azodiphenylbis-[3-(2-thienyl)acrylic acid], 12.0 ml. of thionyl chloride and 50 ml. of benzene is warmed gently. The clear solution is refluxed and the excess thionyl chloride and benzene is removed. The solution is washed with benzene and added to a solution containing 7.0 g. of tropine hydrobromide in 25 ml. of dry pyridine. The mixture is headed at reflux, filtered and the filtrate washed with water and dried to yield 2,2'-p-azodiphenylbis[3-(2-thienyl)acrylic acid, 3-tropanyl ester].

An acetone solution of the free base is reacted with maleic acid to yield the maleate salt.

EXAMPLE 7

To a mixture containing 30.0 g. of m-nitrophenylacetic acid, 14.5 ml. of 2-furfural and 24.4 ml. of triethylamine is added 66.4 ml. of acetic anhydride. The mixture is heated on an oil bath at 100° C. for about one hour, cooled to room temperature and taken up in acetone. The solution is heated with activated carbon, filtered and the acetone evaporated. The mixture is then acidified with concentrated hydrochloric acid, cooled and filtered. The crude acid is recrystallized twice from alcohol to yield 2-m-nitrophenyl-3-(2-furyl)acrylic acid.

A suspension of 14.5 g. of 2-m-nitrophenyl-3-(2-furyl)acrylic acid, 200 ml. of methanol, 10.0 g. of zinc dust and a solution of 9 g. of sodium hydroxide in 60 ml. of water is heated at reflux for one hour. 8.0 g. of additional zinc dust is added and the mixture refluxed for an additional two hours. The mixture is filtered and air is passed through the warm filtrate to form the azo acid salt. The salt is dissolved in aqueous-methanol, acidified and crystallized from dioxane-water to yield 2,2'-m-azodiphenylbis[3-(2-furyl)acrylic acid].

A suspension of 15.0 g. of 2,2'-m-azodiphenylbis-[3-(2-furyl)acrylic acid], 17.0 ml. of thionyl chloride and 100 ml. of benzene is gently warmed. The clear solution is refluxed and the excess thionyl chloride and benzene is removed. The solution is washed with benzene and added to a solution containing 8.5 g. of tropine hydrobromide in 150 ml. of benzene. The mixture is heated at reflux and filtered. The filtrate is washed with water and dried to yield 2,2'-m-azodiphenylbis[3-(2-furyl)acrylic acid, 3-tropanyl ester].

An acetone solution of the free base is reacted with ethyl bromide to yield the ethobromide quaternary salt.

EXAMPLE 8

To a mixture containing 30.0 g. of m-nitrophenylacetic acid, 18.5 g. of 4-pyridylcarboxaldehyde, 24.4 ml. of triethylamine is added 66.4 ml. of acetic anhydride. The mixture is stirred for approximately one hour at room temperature. The solution is cooled and made acetic with concentrated hydrochloric acid. The crude acid is filtered, dried and recrystallized from alcohol to yield 2-m-nitrophenyl-3-(4-pyridyl)acrylic acid.

A suspension of 14.5 g. of 2-m-nitrophenyl-3(4-pyridyl) acrylic acid, 145 ml. of methanol, 9.0 g. of zinc dust and a solution of 18.5 g. of sodium hydroxide in 65 ml. of water is heated at reflux for approximately one hour. An additional 8.0 g. of zinc is added and the mixture refluxed for two additional hours. The mixture is filtered and air is passed through the warm filtrate to form the azo salt. The precipitated salt is dissolved in aqueous-methanol, acidified and crystallized from dioxane-water to yield 2,2'-m-azodiphenyl-bis[3-(4-pridyl)acrylic acid].

A suspension of 8.0 g. of 2,2'-m-azodiphenylbis[3-(4-pyridyl)acrylic acid], 9.0 ml. of thionyl chloride and 75 ml. of benzene is gently warmed. The clear solution is refluxed and the excess thionyl chloride and benzene removed. The solution is washed with dry benzene and added to a solution containing 9.5 g. of tropine in 125 ml. of benzene. The mixture is heated at a reflux and then filtered. The filtrate is washed with water and dried to yield 2,2'-m-azodiphenylbis-[3-(4-pyridyl)acrylic acid, 3-tropanyl ester].

Reacting the free base with bismethylene-salicylic acid in ethyl acetate solution yields the bismethylenesalicylate salt.

EXAMPLE 9

A suspension of 12.0 g. of 2,2'-m-azodiphenylbis-[3-phenylacrylic acid], as prepared in Example 1, 19.5 ml. of thionyl chloride and 80.0 ml. of dry benzene is warmed gently. The solution is refluxed for an hour and the excess benzene and thionyl chloride removed. The solution is further washed with three separate portions of benzene and to this is added 9.1 g. of thiotropine hydrobromide in 35.0 ml. of dry pyridine. The mixture is filtered and the filtrate is washed with water and dried to yield 2,2'-m-azodiphenylbis[3-phenylacrylic acid, 3-thiotropanyl ester].

Hydrogen chloride is bubbled into a solution of the free base to yield 2,2'-m-azodiphenylbis[3-phenylacrylic acid, 3-thiotropanyl ester]dihydrochloride.

What is claimed is:
1. A chemical compound of the formula

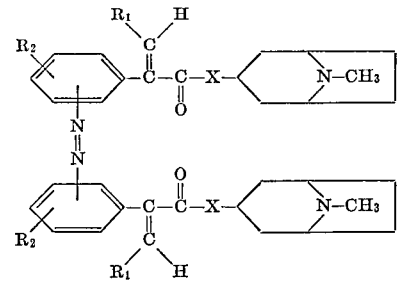

or a pharmaceutically acceptable acid addition salt thereof, in which:
X is oxygen or sulfur,
$R_1$ is phenyl, furyl, thienyl, pyridyl or hydrogen; and
$R_2$ is hydrogen, bromo, chloro or fluoro, hydroxy, lower alkyl or lower alkoxy.
2. A chemical compound in accordance with claim 1 in which X is oxygen.
3. A chemical compound in accordance with claim 2 in which $R_1$ is phenyl.
4. A chemical compound in accordance with claim 3 in which $R_2$ is hydrogen and the azo linkage is in the meta position.
5. A chemical compound in accordance with claim 3 in which $R_2$ is bromo, chloro or fluoro.
6. A chemical compound in accordance with claim 2 in which $R_1$ and $R_2$ are hydrogen and the azo linkage is in the para position.
7. A chemical compound in accordance with claim 2 in which $R_1$ is furyl, $R_2$ hydrogen and the azo linkage is in the meta position.
8. A chemical compound in accordance with claim 2 in which $R_1$ is thienyl, $R_2$ is hydrogen and the azo linkage is in the para position.
9. A chemical compound in accordance with claim 2 in which $R_1$ is pyridyl, $R_2$ is hydrogen and the azo linkage is in the metal position.
10. A chemical compound in accordance with claim 1 in which X is sulfur, $R_1$ is phenyl and $R_2$ is hydrogen.

References Cited

UNITED STATES PATENTS

| | | | |
|---|---|---|---|
| 3,184,467 | 5/1965 | Dold e al. | 260—294.3 |
| 3,285,905 | 11/1966 | Elslager et al. | 260—152 |
| 3,290,281 | 12/1966 | Weinstein et al. | 260—156 XR |
| 3,468,892 | 9/1969 | Tomcufcik et al. | 260—156 XR |

FLOYD D. HIGEL, Primary Examiner

U.S. Cl. X.R.

260—156, 207, 207.1, 295, 332.3, 347.3, 515, 521, 999; 424—226